(12) United States Patent
Chen et al.

(10) Patent No.: US 7,627,205 B2
(45) Date of Patent: Dec. 1, 2009

(54) THERMO-OPTIC DEVICES PROVIDING THERMAL RECIRCULATION

(75) Inventors: Wei Chen, Ellicott City, MD (US); Wenlu Chen, Catonsville, MD (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 12/059,598

(22) Filed: Mar. 31, 2008

(65) Prior Publication Data
US 2009/0022465 A1 Jan. 22, 2009

Related U.S. Application Data

(62) Division of application No. 11/779,600, filed on Jul. 18, 2007.

(51) Int. Cl.
*G02B 6/10* (2006.01)
*G02B 6/12* (2006.01)

(52) U.S. Cl. .................. 385/14; 385/2; 385/8; 385/129

(58) Field of Classification Search ............... 385/2, 385/3, 8, 9, 14, 40, 129–132
See application file for complete search history.

(56) References Cited

U.S. PATENT DOCUMENTS

| 6,122,416 | A | 9/2000 | Ooba et al. |
| 6,310,999 | B1 * | 10/2001 | Marcuse et al. ............... 385/42 |
| 6,567,600 | B2 * | 5/2003 | Yoshida ...................... 385/134 |
| 6,709,882 | B2 | 3/2004 | Trammel et al. |
| 2006/0159384 | A1 | 7/2006 | Sugiyama |
| 2008/0159681 | A1 * | 7/2008 | Gill et al. ....................... 385/4 |

\* cited by examiner

*Primary Examiner*—Daniel Petkovsek
(74) *Attorney, Agent, or Firm*—W. Douglas Carothers, Jr.; David L. Soltz

(57) ABSTRACT

Thermo-optical devices providing heater recirculation in an integrated optical device are described. The thermo-optical devices include at least one waveguide having a non-linear path length in thermal communication with a thermal device. Methods of fabrication and use are also disclosed.

4 Claims, 4 Drawing Sheets

THERMO-OPTIC DEVICES PROVIDING THERMAL RECIRCULATION

CROSS-REFERENCE TO RELATED APPLICATIONS

This is a divisional of Application No. 11/779,600, filed Jul. 18, 2007, the contents of which are incorporated herein by reference.

STATEMENT REGARDING FEDERALLY SPONSORED RESEARCH OF DEVELOPMENT

Not Applicable.

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE §1.52(E)(5))

Not Applicable.

BACKGROUND OF THE INVENTION

Integrated optics is the technology of combining various optical devices and components on a common chip or substrate to transport, focus, multiplex, de-multiplex, split, combine, polarize, isolate, couple, switch, filter, modulate (phase or amplitude), detect, and/or generate light. Optical waveguides and other functional elements alone, or in combination form the optical devices including: optical resonators, arrayed waveguide gratings, couples, splitters, polarization splitters/combiners, polarization rotators, Mach-Zehnder interferometers, multimode interference waveguides, grating, mode transformers, delay lines, optical vias, and the like.

The trend in the field of integrated optics is to densely pack optical devices having varying functions onto a single integrated optical device, such as a planar light-wave circuit, multi-layer planar light-wave circuit, photonic integrated circuit and the like. Densely packing optical devices requires strategic placement of optical waveguides. Generally, the ability to shrink the dimensions of an optical device is limited by the refractive index contrast of the optical waveguides from which it is formed. For example, an optical device is constrained by the minimum allowable radius of curvature of its optical waveguides before the optical waveguide incurs significant optical propagation loss.

Thermal devices are also commonly included within integrated optical devices for heating optical waveguides through the use of local resistive heating elements. Heating manipulates the optical properties of the output signal such as center wavelength, amplitude, phase, and shape. For example, heating an optical waveguide can alter the refractive index affecting the phase of the optical signal propagating through the optical waveguide. Each thermal device requires substantial power consumption to achieve a lucrative response. The trend towards densely packing multiple optical devices utilizing these thermal devices results in an increase in the power demand for the integrated optic device to support the desired functions.

BRIEF SUMMARY OF THE INVENTION

In one embodiment, the present invention is related to a thermo-optical device for providing heat recirculation in an integrated optical device. In general, the thermo-optical device is provided with at least one waveguide and a thermal device. The waveguide comprises a thermal tuning section and the thermal device is in thermal communication with the thermal tuning section of the waveguide.

In one version, the thermal device defines a region having a thermal boundary. The thermal tuning section of the waveguide traverses the region such that the path length of the thermal tuning section within the thermal boundary is greater than the greatest linear dimension of the thermal boundary. The thermal tuning section can traverse the region of the thermal device one or several times. In another version, the ratio of the surface area of the thermal device to the surface area of the waveguide is less than 5.

In addition, portions of the thermal tuning section can have a non-linear shape along the path length. For example, portions of the thermal tuning section can have non-linear shape such that the entire thermal tuning section resembles a serpentine shape.

In another aspect, the present invention is directed towards a planar lightwave circuit having thermal recirculation is provided. The planar lightwave circuit comprises a substrate, cladding on the substrate, and a thermo-optic device. The thermo-optic device is provided with at least one waveguide on the cladding and a thermal device in thermal communication with at least a portion of the waveguide.

In another aspect, the present invention is directed towards a method for fabricating a thermo-optic device of an integrated optical device. An image is formed in a photoresist layer on core material constructed of optically transparent material. The image has a predetermined pattern indicative of a portion of a waveguide of the thermo-optic device. The photoresist layer is developed to form a mask having the predetermined pattern of the portion of the waveguide. The predetermined pattern is transferred to the core material. A thermal device is positioned adjacent to the thermal tuning section of the waveguide to form a thermal region. In one version, the core material and the cladding have an index contrast greater than 0.5%.

In another aspect, the present invention is directed towards a method of using a thermo-optic device of an integrated optical device to alter the refractive index and modulate the phase difference of a light signal propagating through the integrated optical device. A portion of at least one waveguide arm is heated using a thermal device wherein the portion of the waveguide arm is comprised of a non-linear thermal tuning section.

BRIEF DESCRIPTION OF THE SEVERAL VIEWS OF THE DRAWING

So the above-recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally-effective embodiments.

DETAILED DESCRIPTION OF THE INVENTION

Figure 1:
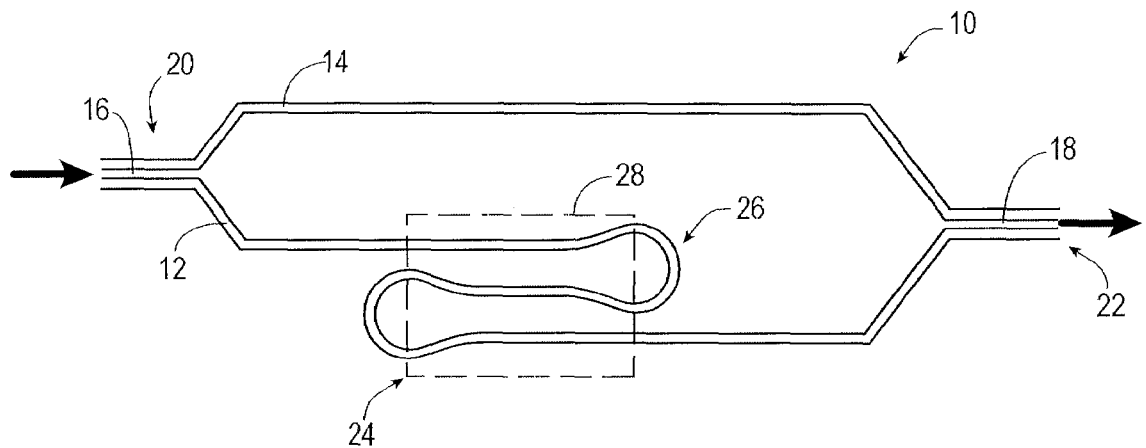
FIG. 1 is a schematic diagram of one exemplary embodiment of an integrated optical device having thermal recirculation in accordance with the present invention.

Embodiments of the invention are shown in the above-identified FIGURES and described in detail below. In describing the embodiments, like or identical reference numerals are used to identify common or similar elements. The FIGURES are not necessarily to scale and certain features and certain views of the FIGURES may be shown exaggerated in scale or in schematic in the interest of clarity and conciseness.

Referring now to the drawings and in particular to FIG. 1, shown therein and designated by a reference numeral 10 is a schematic diagram of an integrated optical device having thermal recirculation provided by a thermo-optical device in accordance with the present invention.

The integrated optical device 10 is shown by way of example as a Mach-Zehnder interferometer. However, integrated optical devices 10 used in accordance with the present invention function in the transport, focusing, multiplexing, demultiplexing, splitting, combining, polarizing, isolating, coupling, switching, filtering, modulating (phase or amplitude), detecting, and/or generation of light. For example, the integrated optical device may be a planar light-wave circuit, a multiple layer planar light-wave circuit, a photonic integrated circuit, or any other integrated optical device combining optical devices performing one or more optical function. Such optical devices include: optical resonators, arrayed waveguide gratings, couplers, splitters, polarization splitters/combiners, polarization rotators, Mach-Zehnder interferometers, multimode interference waveguides, gratings, mode transformers, delay lines, optical vias, and/or any other optical element providing the functions as described above.

The integrated optical device 10 of FIG. 1 is comprised of at least two waveguide arms 12 and 14 and at least two directional couplers 16 and 18. The directional couplers 16 and 18 couple the waveguide arms 12 and 14 together at a first end 20 and a second end 22. Preferably, light is input into the first end 20 of the integrated optical device 10, is split by the directional coupler 16, follows the path lengths of the waveguide arms 12 and 14, and is output at the second end 22. Alternatively, light can be input into the second end 22 of the integrated optical device 10, is split by the directional coupler 18, follows the path lengths of the waveguide arms 12 and 14, and is output at the first end 20.

When light is input into the first end 20, generally it is split into each waveguide arm 12 and 14 by the directional coupler 16 with equal optical power, (although this can be varied), and a pi phase difference. As the light travels through the waveguide arms 12 and 14, the phase difference can be altered using a temperature differential between the two waveguide arms 12 and 14. After passing through the directional coupler 18, the light recombines at the second end 22 based upon the phase difference.

As is well known in the art, selective heating of waveguide arms 12 and/or 14 alters the refractive index and thereby modulates the phase difference of light propagating through the waveguide arms 12 and/or 14. One common practice is using a substrate heater to heat the entire integrated optical device 10. Such practice does not provide selective heating of specific elements within the integrated optical device 10 and in many instances is energy inefficient.

The integrated optical device 10 of the present invention includes a thermal-optic device 24 designed to provide the temperature differential and includes a portion 26 of the waveguide arm 12 in thermal communication with a thermal device 28. Preferably, the thermal device 28 heats the portion 26 of the waveguide arm 12. It is further contemplated, the thermal device 28 provides a cooling mechanism, alternatively or in addition to the heating mechanism.

Heat provides a shift in the phase of the optical signal within the waveguide arm 12 through the thermo-optic effect on the refractive index as discussed above. As the thermal optical coefficient can be positive or negative depending on the type of material used, the phase change induced by the thermal optic effect can be either positive and/or negative. Alternatively, the thermal device 28 can heat the portion 26 of the waveguide arm 12 to provide alterations of other optical properties such as center wavelength, amplitude, group delay, birefringence, attenuation, gain, and/or shape.

Examples of suitable thermal devices 28 for use within the present invention include heaters, thermoelectric coolers, or any other element that can transfer heat to or from the portion 26 of the waveguide arm 12. Preferably, the thermo-optic device 28 is a heater (or a set of heaters), such as a resistive heater, localized to the portion 26 of the waveguide arm 12. Resistive heaters can be fabricated by the deposition and patterning of metal films and/or semiconductor materials including platinum, gold, aluminium, chrome, nickel, nichrome, tungsten, polysilicon, and the like.

The portion 26 of the waveguide arm 12 in thermal communication with the thermal device 28 is located anywhere along on the length of the waveguide arm 12 from the first end 20 to the second end 22 of the integrated optical device 10. Location of the portion 26 of the waveguide arm 12 will depend on the use and simplicity of design considerations for the integrated optical device 10. Preferably, the portion 26 of the waveguide arm 12 is located approximately mid-way between the first end 20 and the second end 22. Although FIG. 1 illustrates the use of only one portion 26 of the waveguide arm 12, it is contemplated that the thermal-optic device 24 can include multiple portions along the length of waveguide arm 12 and/or 14. The portion 26 of the waveguide arm 12 may include an open path length design as illustrated in FIG. 1 and/or include a closed path length design (e.g. resonators).

Figure 2:
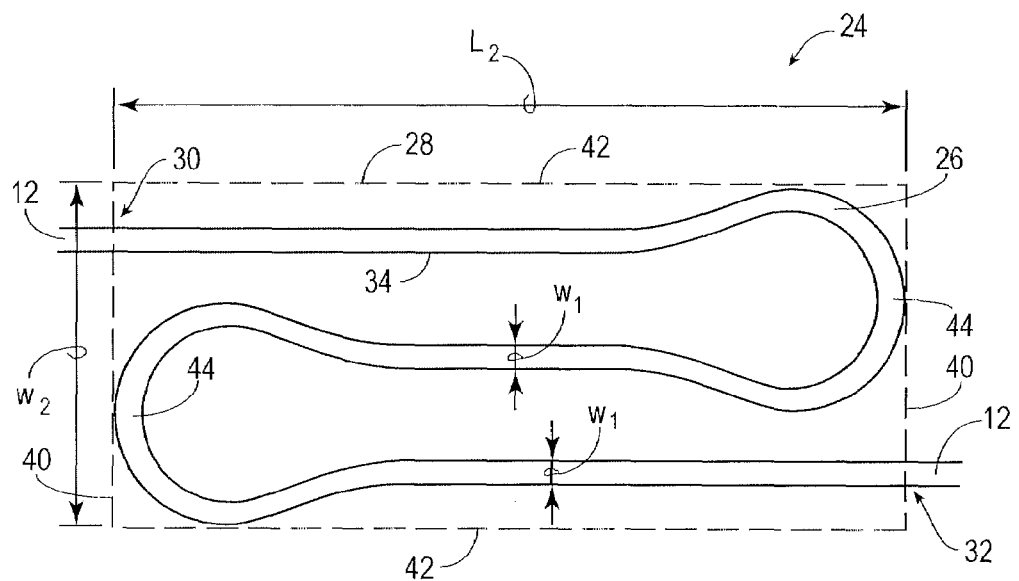
FIG. 2 is a schematic diagram of one exemplary embodiment of a thermal-optic device for use in the integrated optical device of FIG. 1.
Figure 3:
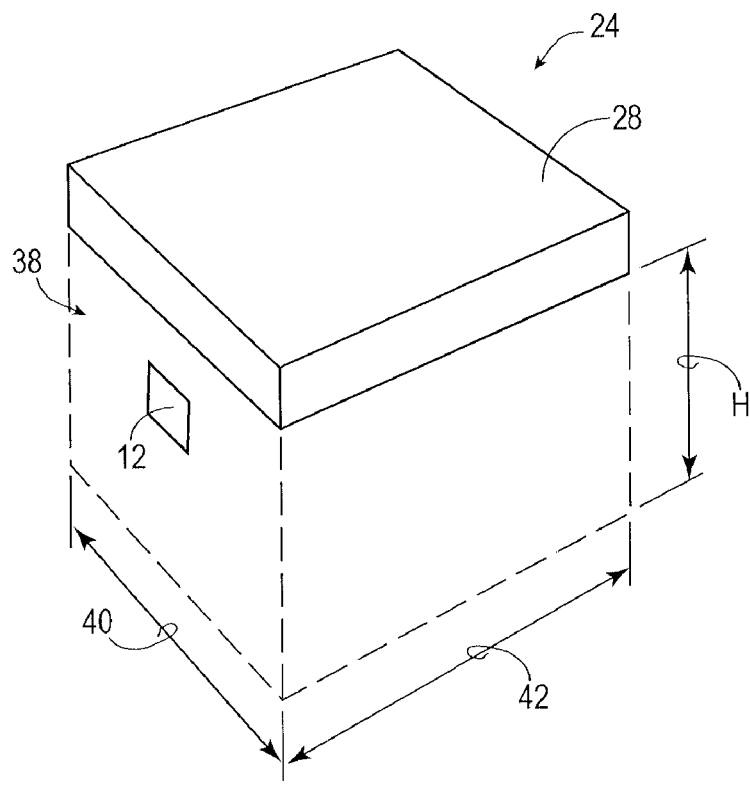
FIG. 3 is a fragmental, perspective view of the thermal-optic device illustrated in FIGS. 1 and 2.

Referring now to FIGS. 2 and 3, illustrated therein are two different diagrammatic views of the thermal-optic device 24 depicted in FIG. 1. The portion 26 of the waveguide arm 12 in the thermal-optic device 24 includes an input section 30, an output section 32, and a thermal tuning section 34 having a path length extending between the input section 30 and the output section 32. Generally, the thermal tuning section 34 has a continuous width ($w_1$) from the input section 30 to the output section 32. Alternatively, the thermal tuning section 34 can have a varying width between the input section 30 and the output section 32. The surface area of the thermal tuning section 34 is defined by the path length and width ($w_1$).

The surface area of the thermal device 28 (depicted as dashed lines) is defined by a length ($L_2$) and a width ($w_2$). The length ($L_2$) of the thermal device 28 is generally comparable to the length ($L_1$) of the portion 26 of the waveguide 12 from the input section 30 to the output section 32 as illustrated in FIG. 2. The width ($w_2$) of the thermal device 28 is desirably between one to ten times the width ($w_1$) of the thermal tuning section 34. The portion 26 of the waveguide 12 is preferably designed such that the ratio of the surface area of the thermal device 28 to the surface area of the thermal tuning section 34 is less than 5.

The thermal device 28 defines a thermal region 38 having thermal boundaries 40 and 42. The thermal region 38 is an area of thermal communication from the thermal device 28 to the portion 26 of the waveguide arm 12. For simplicity, the thermal region 38 is described and illustrated as a geometric shape, i.e. rectangular, defined by thermal boundaries 40 and 42 in dimensions comparable to the thermal device's 28 length ($L_2$) and width ($w_2$). However, it will be apparent to one skilled in the art, that heat is able to transgress the thermal boundaries 40 and 42. Further, the thermal device 28 and the thermal region 38 can have any geometric, non-geometric or fanciful shape.

As well known in the integrated device industry, thermal devices 28 require a substantial amount of power to provide a desired reaction within the integrated optical device 10. As such, the thermo-optical device 24 is designed to enhance the amount of thermal communication between the thermal device 28 and the portion 26 of the waveguide arm 12 without incurring substantial power loss.

Generally, in order to design for enhanced thermal communication without substantial power loss, the path length of the thermal tuning section 34 between the input section 30 and the output section 32 and within the boundaries 40 and 42 of the thermal region 38 is greater than the length of any linear dimension of the thermal region 38, e.g., either thermal boundaries 40 or 42 or a diagonal of the thermal region 38. In a preferred embodiment, for the path length to be greater, at least a portion of the thermal tuning section 34 forms a non-linear shape along the path length. For example, the design of the thermal tuning section 34 includes at least one curvature or bend 44 as illustrated in FIG. 2. The bend 44 allows the thermal tuning section 34 to traverse the thermal region 38 of the thermal device 28 at least twice.

Bends 44 are designed such that the radius of curvature does not provide any significant optical propagation loss. For example, the radius of curvature along within the range of 5 μm-500 μm provides a curve in the waveguide without any significant optical propagation loss. The range of 5 μm-500 μm relies on a high index contrast in the formation of the integrated optical device discuss in further detail below. Additional useful ranges for the radius of curvature are contemplated and not limited to 5 μm-35 μm.

Although the thermal tuning section 34 is provided with two bends 44 forming a serpentine in FIG. 2, any fanciful shape may be used to maximize the portion 26 of the waveguide arm 12 in thermal communication with the thermal device 28 as long as one or more bends 44 associated with the design do not have a radius of curvature providing significant unwanted optical propagation loss.

Figure 4:
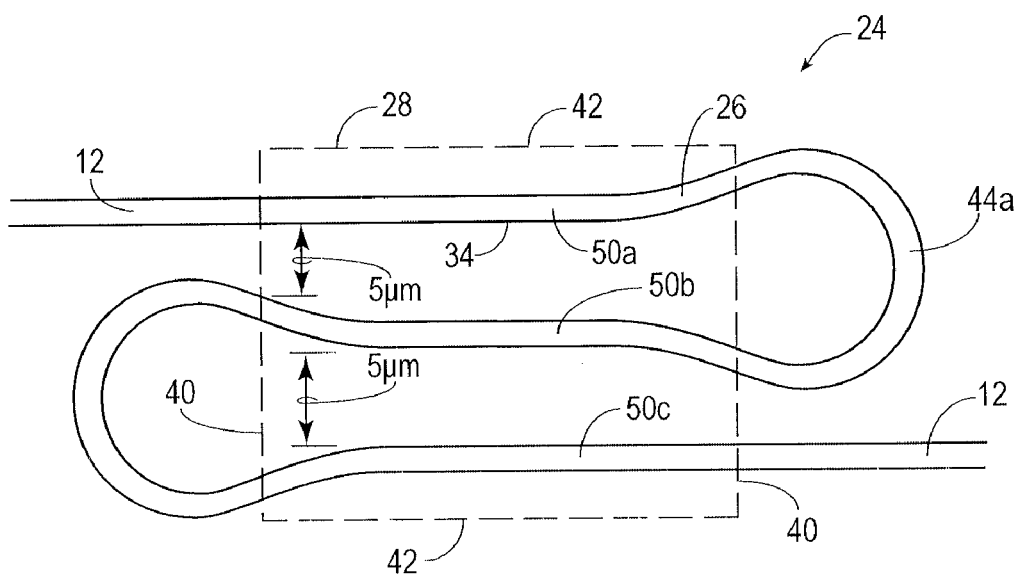
FIG. 4 is a schematic diagram of another embodiment of a thermal-optic device for use with an integrated optical device providing limited cross talk and power loss in accordance with the present invention.

Additionally, if the thermal tuning section 34 traverses across the thermal region 38 multiple times, the amount of cross talk and power loss must be limited. FIG. 4 illustrates an embodiment of the thermo-optic device providing limited cross talk and power loss. In this embodiment, the path length of the thermal tuning section 34 is defined by bars 50a-50c and bends 44a and 44b. The bars 50a-50c of the thermal tuning section 34 are within the thermal boundaries 40 and 42 while the bends 44a and 44b are located outside of the thermal boundaries 40 and 42. The spacing of each bar 50a-50c is set at a minimum distance that prevents the optical modes in adjacent waveguides from interacting with each other while allowing for multiple traversals of the thermal tuning section 34. For example, the spacing of each bar 50a-50c can be set at 5 μm apart from the adjacent bar 50a-50c.

Figure 5:
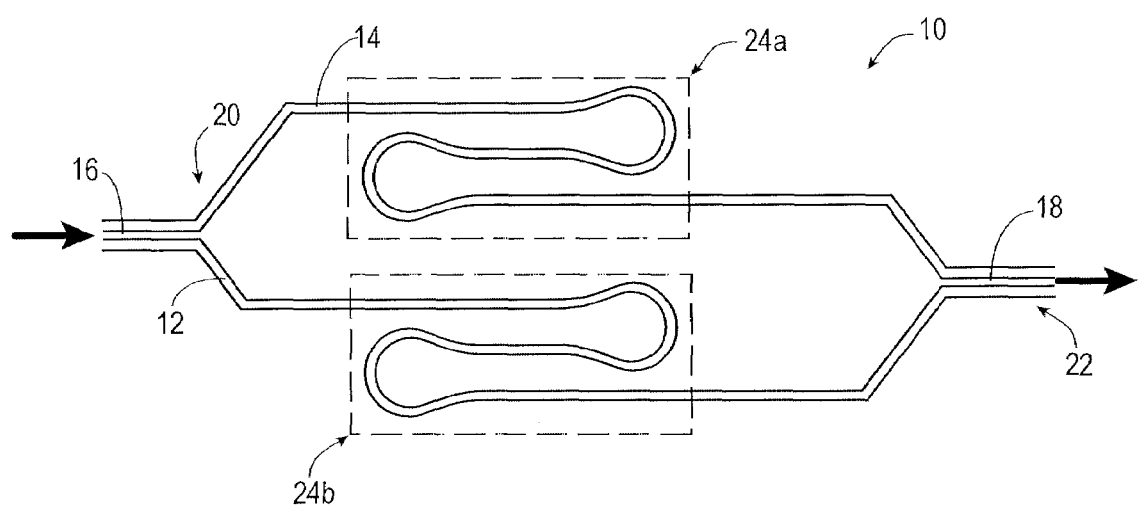
FIG. 5 is a schematic diagram of another embodiment of an integrated optical device having thermal recirculation in accordance with the present invention.

FIG. 5 is a schematic diagram of an another embodiment of the integrated optical device 10 which is similar to the embodiment shown in FIG. 2, except that the embodiment of FIG. 5 incorporates at least two thermal-optic devices 24a and 24b. The use of two thermal-optic devices 24a and 24b within the integrated optical device 10 provides a mechanism for controlling light propagating through both waveguide arms 12 and 14.

Figure 6:
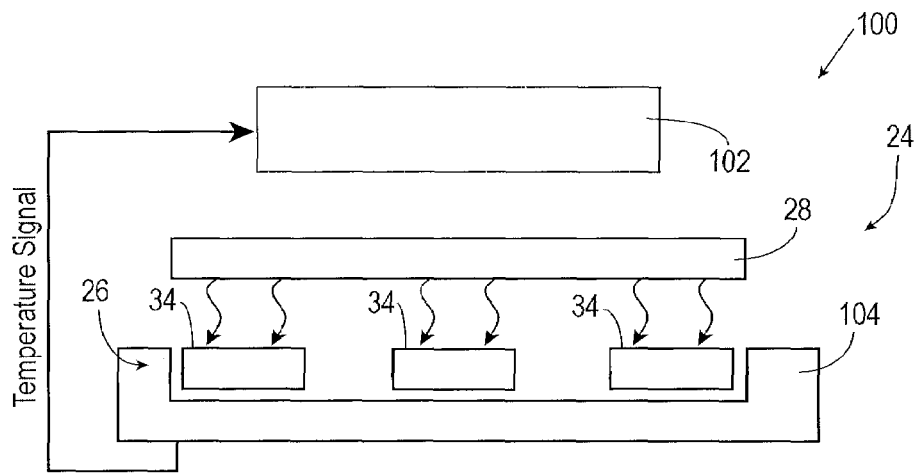
FIG. 6 is a schematic block diagram of a control system for use with an integrated optical device having any of the thermal-optic devices depicted in FIGS. 1-5.

Referring now to FIG. 6, shown therein is an embodiment of the thermo-optical device 24 including a control system 100 to adjust, regulate, or control the power dissipation of the thermal-optic device 24, and in particular the thermal device 28. The control system 100 includes a controller 102 and a temperature sensor 104. The controller 102 monitors a temperature signal from the temperature sensor 104 and alters the power dissipation of the thermal device 28 based on the temperature signal. Alternatively, the controller 102 can alter the output phase of the waveguide arm 12 and/or integrated optical device 10 and alter the power dissipation of the thermal device 28 based on the output phase.

The temperature sensor 104 is preferably localized at the portion 26 of the waveguide 12 within the thermal region. Alternatively, the temperature sensor 104 can be localized at the thermal device 28. The temperature sensor 104 may include any type of device for detecting temperature or exchange of heat, such as a resistive temperature device (RTD). Exemplary RTDs include metal film resistors, thermistor, thermocouples, temperature sensing diodes, or the like.

The controller 102 alters the power dissipation of the thermal device 28 based upon the temperature signal and regulates the power dissipation of the thermal device 28 to a predetermined set value or set point. For example, the controller 102 can adjust the thermal device 28 through an analog change in voltage applied to the thermal device 28. Alternatively, the controller 102 can alter power dissipation through a change in a duty cycle of a digital pulse train, or filtered digital pulse train directed to the thermal device 28.

Figure 7:
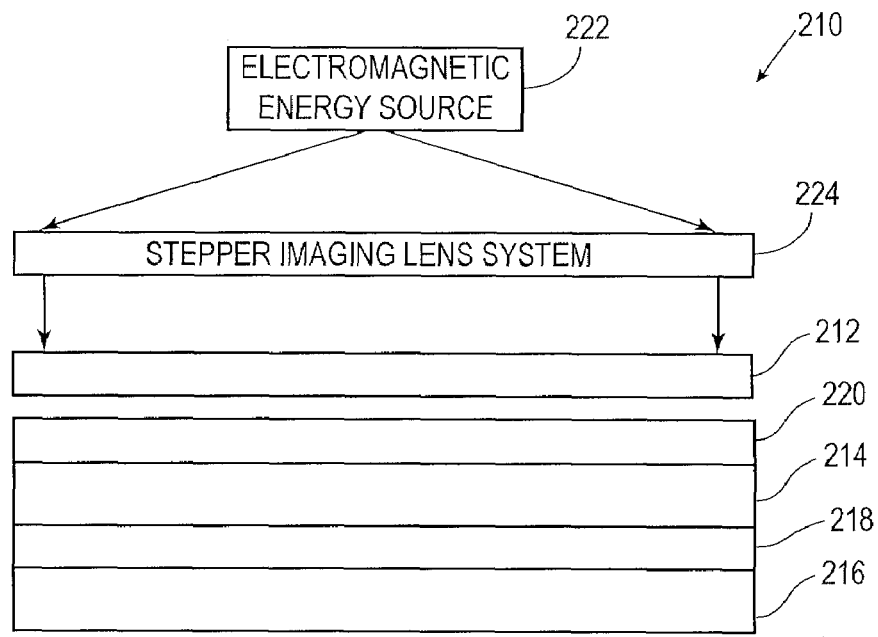
FIG. 7 is a diagrammatic view of an exemplary photolithography system for transferring patterns of a thermal tuning section on a photomask to a thin film optical material on a substrate in accordance with the present invention.

Referring now to FIG. 7, shown therein is an exemplary photolithography system 210 for transferring one or more patterns of the integrated optical device 10, and in particular the thermal-optic device 24 on a photomask 212 to a core material 214 on a substrate 216 in accordance with the present invention. In this embodiment, the core material 214 is a thin film constructed of a material selected from a group consisting of silicon, silicon nitride, silicon oxynitride, silicon oxycarbide, germanium doped silica, Indium Phosphide, Gallium Arsenide, high index polymers, and combinations thereof. The core material 214 is deposited on a cladding material 218 constructed of a material having an index of refraction that is lower than the index of refraction of the core material 214. Preferably, the core material 214 and the cladding 218 have a refractive index contrast greater than 0.5. The cladding material 218 can be selected from a group consisting of silica, lower index silicon oxynitride, lower index silicon oxycarbide, Indium Galium Arsenide Phosphide, polymers, and combinations thereof. Various examples of combinations of thin film optical materials and claddings suitable (and methods of making same) for forming the core material 214 and cladding material 218 are discussed in U.S. Pat. No. 6,614,977, the entire content of which is hereby incorporated herein by reference.

A photoresist layer 220 is disposed on the core material 214. In general, the photoresist layer 220 is constructed of a material that prevents material beneath the photoresist layer 220 from being removed or material directly underneath the photoresist layer 220 to be removed during a subsequent process for removing predetermined parts of the core material 214, such as an etching process. Thus, the photoresist layer 220 can be either a positive photoresist or a negative photoresist. The present invention will be described herein by way of example as the photoresist layer 220 being a positive photoresist and in side-elevation without showing top plan view of the pattern of the photomask 212 or the thermal tuning section 34 of the portion 26 of the waveguide. The photoresist layer 220 can be provided on the core material 214 utilizing any suitable process, such as spin coating, for example.

The photolithography system 210 is also provided with an electromagnetic energy source 222 directing energy through a stepper imaging lens system 224 and the photomask 212 to the photoresist layer 220. The electromagnetic energy source 222, such as a high intensity ultraviolet light source or the like, provides electromagnetic energy capable of reacting with the photoresist layer 220 to transfer the pattern on the photomask 212 to the photoresist layer 220.

The stepper imaging lens system 224 receives the electromagnetic energy from the electromagnetic energy source 222 and directs such energy to the photomask 212 which exposes parts of the photoresist layer 220 to the electromagnetic energy. Such exposure can be by any suitable method, such as contact, proximity, and projection.

Figure 8:
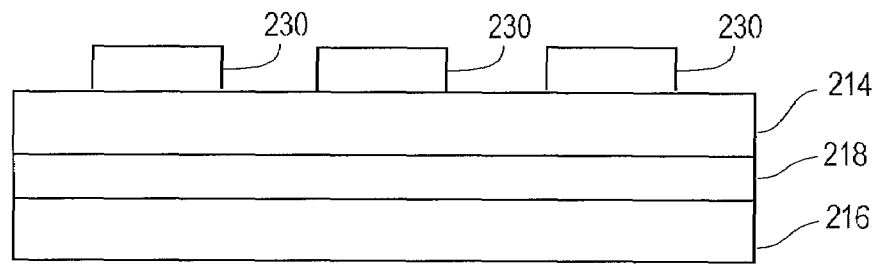
FIG. 8 is a diagrammatic view of an exemplary positive mask of a thermal tuning section formed on the thin film optical material utilizing the photolithography system of FIG. 7.
Figure 9:
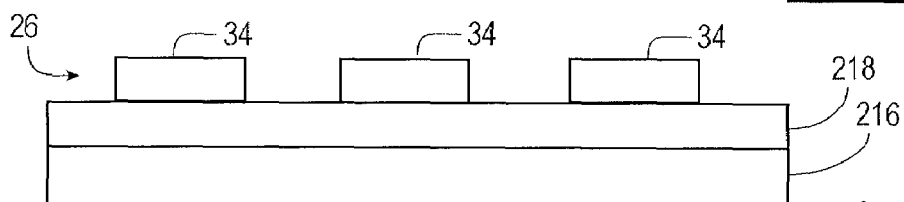
FIG. 9 is a diagrammatic view of a thermal tuning section formed from the thin film optical material using the mask depicted in FIG. 8.

Once the photoresist layer 220 has been exposed, then such photoresist layer 220 is developed to form a mask 230 in the geometry of the thermal tuning section 34 as shown in FIG. 8. Once the mask 230 is formed, then the pattern formed by the mask 30 is transferred into the core material 214 to form the thermal tuning section 34 as shown in FIG. 9. The transferring can be accomplished by any suitable process, such as an etching process. It should be understood that the thermal tuning section 34 forming elements of the thermo-optical device 24 referred to herein may be formed using standard or later developed techniques used in the semiconductor industry to deposit and pattern optical waveguide materials, e.g., (dry-etch, wet-etch, flame hydrolysis deposition (FHD), chemical vapor deposition (CVD), reactive ion etching (RIE), physically enhanced CVD (PECVD), or the like.

Figure 10:
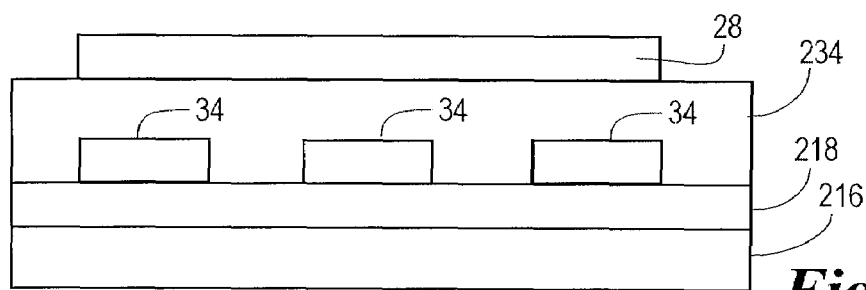
FIG. 10 is a diagrammatic view of a thermo-optic device including a thermal tuning section formed from the thin film optical material as depicted in FIG. 9.

Once the thermal tuning section 34 is formed, the mask 230 is removed, and another layer of cladding material 234 is deposited over the entire surface as illustrated in FIG. 10 and planarized if necessary utilizing any suitable process. For example, a process for applying another layer of cladding material is discussed in U.S. Pat. No. 6,768,828 entitled "Integrated Optical Circuit with Dense Planarized Cladding Layer"; the entire content of which is hereby expressly incorporated herein by reference. The thermal device 28 is positioned in thermal communication with the thermal tuning section 34 forming the thermal-optic device 24. As illustrated in FIG. 10, the thermal device 28 can be layered above the layer of cladding material 234. Alternatively, the thermal device 28 can be placed within any layer of material forming the integrated optical device 10. For example, the thermal device 28 may be located within the layer of cladding material 234.

While the above methods for fabricating the integrated optical device 10 of the present invention are described above in terms of fabricating the thermo-optical device 24, it should be apparent to those skilled in the art that such fabrication methods, as well as any other appropriate fabrication techniques currently known in the art or later developed, can be utilized to fabricate one or more integrated optical devices, or portions thereof.

Computer software code can be utilized to allow a user to construct a virtual representation of the integrated optical device 10 and/or thermo-optic device 24. For example, such a tool can be implemented utilizing Optical Waveguide Mode Suite (OWMS) and Beam propagation solver software available from Apollo Photonics Corp. of Burlington, Ontario, Canada. This software also allows for numeric simulation using a full vector Beam Propagation Method (FV-BPM) (see also, W. P Huang and C. L. Xu, "Simulation of three-dimensional optical waveguides by a full-vector beam propagation method," IEEE J. Selected Topics in Quantum Electronics, vol. 29, pp. 2639-2649, 1993, the entire content of which is hereby incorporated herein by reference.) The FV-BPM takes into account polarization effects including rotation of the optical field.

For example, software code stored on one or more computer readable medium and executed by a suitable processor can be used to provide a user interface to the user (e.g., via a monitor of a computer system) which receives input from the user (e.g., via a keyboard and/or mouse of the computer system). The user can input information into the user interface that defines one or more parameters associated with the thermal-optic device 24 or the integrated optical device 10. The software code can then store the inputted parameters on the one or more computer readable medium and utilize the inputted parameters to generate and display a virtual representation of the thermal-optic device 24 or integrated optical device 10 corresponding to such parameters. Such parameters received from the user can include for example one or more of the following: width, length of shape of the thermal-optic device 24 and/or the integrated optical device 10, or any other geometric feature or property of the thermal optic device 24 and/or the integrated optic device 10.

As discussed above, in one embodiment, the virtual representation can be used to simulate the geometries and properties associated with the resulting thermal optic device 24 and/or the integrated optic device 10 structure. Further, such a virtual representation can be incorporated into a design application (such as OWMS) which allows the virtual representation to be positioned within a design in combination with other elements, such as in the design of chips and/or wafers having a plurality of chips. Such capability allows the thermal optic device 24 and/or the integrated optic device 10 designed by the user (or having predetermined parameters) to be evaluated in combination with other elements of use.

It will be understood from the foregoing description that various modifications and changes may be made in the preferred and alternative embodiments of the present invention without departing from its true spirit. Simplicity of design within the description refers to design parameter considerations known within the art and may include financial and practical considerations for use of the device. This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A thermal-optic device comprising:

a substrate;

a Mach-Zehnder interferometer provided on the substrate, the Mach-Zehnder interferometer including a first coupler, a second coupler, and first and second waveguide arms extending between the first coupler and the second coupler, wherein the first waveguide arm includes an input section configured to receive light from the first coupler, an output section configured to supply the light to the second coupler, and a thermal tuning section having a path length along which the light propagates between the input section and the output section, the waveguide having a surface area defined by the path length and a width of the thermal tuning section, the waveguide further including a cladding layer and a core layer provided on the cladding layer, the core layer having a first refractive index and the cladding layer having a second refractive index less than the first refractive index, a difference between the first refractive index and the second refractive index being greater than 0.5; and a resistive heater provided on the substrate and in thermal communication with the thermal tuning section of the waveguide, the resistive heater having a surface area, wherein a ratio of the surface area of the resistive heater to the surface area of the waveguide is less than 5, the resistive heater defining and being coextensive with a first region on a surface of the substrate, the thermal tuning section including first and second parallel portions of the first waveguide arm and a bend portion connecting the first and second parallel portions of the first waveguide arm, the first and second parallel portions of the first waveguide arm defining first and second area portions within the first region and the bend portion defining a second region on the surface of the substrate, the second region being outside the first region.

2. A waveguide optical device in accordance with claim 1, wherein the cladding layer is a first cladding layer, the waveguide optical device further including a second cladding layer provided on the core layer.

3. A waveguide optical device in accordance with claim 1, wherein the core layer includes a material selected from the group consisting of: silicon, silicon nitride, silicon oxynitride, silicon oxycarbide, germanium doped silicon, indium phosphide, and gallium arsenide.

4. A waveguide optical device in accordance with claim 1, wherein the cladding layer includes silica.

* * * * *